Figure 1:
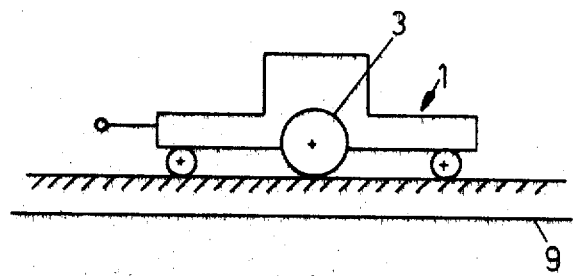

United States Patent [19]
Marshall et al.

[11] 3,893,536
[45] July 8, 1975

[54] VEHICLE GUIDANCE SYSTEM OPERATING IN THE BANG BANG MODE

[75] Inventors: Leonard Marshall, Fleet; David S. Hobday, Farnborough, both of England

[73] Assignee: E. R. A. Patents Limited, Surrey, England

[22] Filed: Nov. 13, 1973

[21] Appl. No.: 415,347

[30] Foreign Application Priority Data
Nov. 14, 1972 United Kingdom............. 52586/72

[52] U.S. Cl. .................................. 180/98; 318/587
[51] Int. Cl. ............................................. B62d 1/24
[58] Field of Search ....... 180/98, 6.5; 318/587, 624, 318/678, 681

[56] References Cited
UNITED STATES PATENTS

| | | | |
|---|---|---|---|
| 3,482,644 | 12/1969 | Krieger | 180/98 |
| 3,498,403 | 3/1970 | Kohls | 180/98 |
| 3,563,327 | 2/1971 | Mier | 180/98 X |
| 3,598,196 | 8/1971 | Ballantyne | 180/98 X |
| 3,614,990 | 10/1971 | Schnitzler | 180/98 |
| 3,669,205 | 6/1972 | Brooke | 180/98 |
| 3,679,019 | 7/1972 | Hobday | 180/98 |
| 3,736,486 | 5/1973 | Gould | 318/624 |

*Primary Examiner*—Robert R. Song
*Assistant Examiner*—Terrance L. Siemens
*Attorney, Agent, or Firm*—Kemon, Palmer & Estabrook

[57] ABSTRACT

In a vehicle guidance system for guiding a vehicle along a path defined by a guidance conductor, the deviation of the vehicle from the path is sensed and whenever the deviation reaches a predetermined value in either direction the vehicle steering mechanism is activated to a fixed amount in the required direction for correcting the deviation. The steering mechanism remains activated by the fixed amount until the deviation is reduced below the predetermined value. The steering mechanism is then de-activated and returns to the zero position. The monitoring of the deviation is preferably carried out by sensing means which provides two signals which vary differentially depending on the deviation, the steering mechanism being activated when the difference between the signals exceeds a preset level.

14 Claims, 8 Drawing Figures

VEHICLE GUIDANCE SYSTEM OPERATING IN THE BANG BANG MODE

This invention relates to electrically-operated guidance systems for vehicles by means of which a vehicle is caused to follow a path defined by an electrical conductor supplied with alternating current.

For this purpose, sensing heads may be mounted at equal distances on either side of the vehicle so that, when the vehicle is directly above the conductor, equal signals are received by the two heads. As soon as the vehicle starts to depart from the path defined by the conductor, the sensing heads are no longer symmetrically arranged in relation to the conductor and unequal signals are received which are used to control steering mechanism in such a way as to tend to bring the vehicle back to the required path. As the vehicle returns towards this path, the difference between the two signals decreases accordingly and the steering mechanism is gradually brought back to a zero position when the vehicle is once again on the required path. Alternatively, a suitably designed single head positioned on or near the fore-aft centre line of the vehicle may be used to provide the necessary control signal.

A vehicle guidance system of the above type is applicable to a wide variety of vehicles such as, for example, trucks which are required to follow a set path through a factory, or agricultural tractors which, by following a set path, can dispense with the need for a driver in carrying out routine agricultural operations.

According to the present invention the steering mechanism of a vehicle which is required to follow a path defined by an electrical conductor as just described, is controlled in such a way that when the deviation of the vehicle from the path exceeds a predetermined value, the steering mechanism is activated by a fixed amount in the appropriate direction, this fixed amount being maintained until the deviation is reduced to said predetermined value again when the steering mechanism is de-activated to a datum condition.

In other words, the steering mechanism is either activated to its fixed extent about the datum or it is de-activated to the datum condition, and the system therefore operates on a simple on/off basis around the datum, or as a so-called "bang-bang" system, without the complications of proportional control which have always been considered necessary in the past.

Such a simple type of control system is particularly suitable for a slow moving vehicle. One particular example of such a vehicle is an irrigation machine which is normally required to travel in a prescribed path over the area to be irrigated at a very low speed of, for example, 1 foot per minute. The invention is by no means limited to such low speeds as this, however, and is broadly applicable to any vehicle which does not move at a high speed.

Preferably when the vehicle is directly centred over the conductor defining the path, no error signal is derived from the sensing means, but there is a steadily increasing error signal as the vehicle moves to one side or the other of the path. Initially, no steering action is taken until the error signal exceeds a predetermined value and there is accordingly a dead zone on either side of the centre line of the path. As soon as this dead zone is exceeded, the steering mechanism is brought into action until the dead zone is once again reached. It will thus be understood that the width of the dead zone depends on the predetermined value of the error signal at which the steering mechanism is activated about the datum and this can be selected in accordance with the accuracy of the steering required.

The accuracy of the steering is increased if the sensing means is mounted in front of the vehicle in respect of the direction of travel. Thus if, for example, the sensing means is mounted on a boom in front of the vehicle, any relatively small angular deflection of the vehicle results in a correspondingly greater lateral displacement of the sensing means which thus move outside the dead zone before the vehicle itself has departed from the centre line of the path to any appreciable extent.

Any convenient form of steering mechanism can be used which can be set selectably in three alternative steering conditions, in one of which the vehicle is directed along a datum path. and in the others of which a fixed amount of steering control is applied to the right or to the left, respectively, about the datum. For example, the steering mechanism may comprise conventional steering linkages driven by hydraulic rams and acting on a pair of steerable wheels. The rams would then be supplied with hydraulic fluid from a pump under the control of steering actuators which could comprise solenoid-operated valves. Alternatively, individual drum or disc brakes might be provided on two driving wheels of the vehicle, the brakes being electromagnetically or hydraulically operated. The brake shoes or pads would then be operated by steering actuators which, in the case of electromagnetic operation could be solenoid with coils in combination, if necessary, with amplifiers for feeding the coils. In the case of hydraulic operation, such actuators could be hydraulic fluid supply valves as mentioned above. As a third alternative, separate drives to the two driving wheels might be provided to cause the vehicle to steer by differential changes in the driving speeds of the two wheels, under the control of steering actuators. It is important that the mechanism used should provide a constant steering or turning effect about the datum immediately after it is activated or very soon thereafter.

Two signals are preferably derived from the sensing means and in order to obtain the error signal for control purposes, the signals are preferably first amplified, rectified and applied with opposite polarity to the ends of a potential divider. When the sensing means is correctly disposed with respect to the wire, the ends of the potential divider are at potentials of equal magnitude but of opposite polarity with respect to the mid point. A reference voltage is supplied which is equal to the potential of this mid point. When the sensing means begins to deviate, the potential of the mid point will depart from the value of the reference voltage, and the difference between the two voltages then provides a measure of the deviation and can be used to control the steering mechanism accordingly.

The datum condition will have zero steering effect if the prescribed path is substantially straight or of large radius of curvature, and may have a steering effect related to the radius of curvature of the prescribed path for relatively small radii of curvature.

Figure 2:
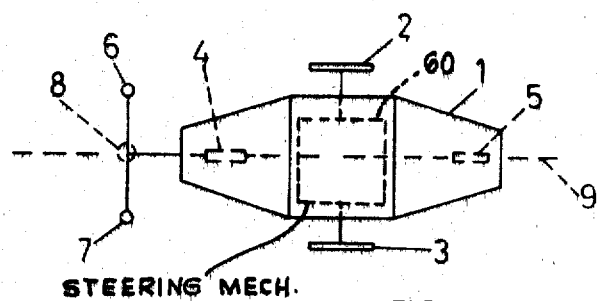
Figure 3:
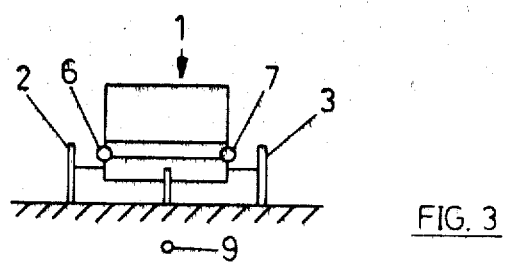
Figure 4:
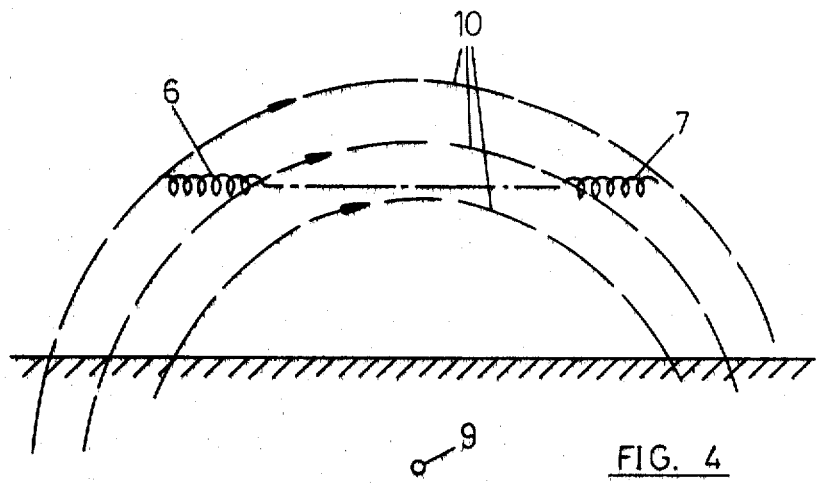
Figure 5:
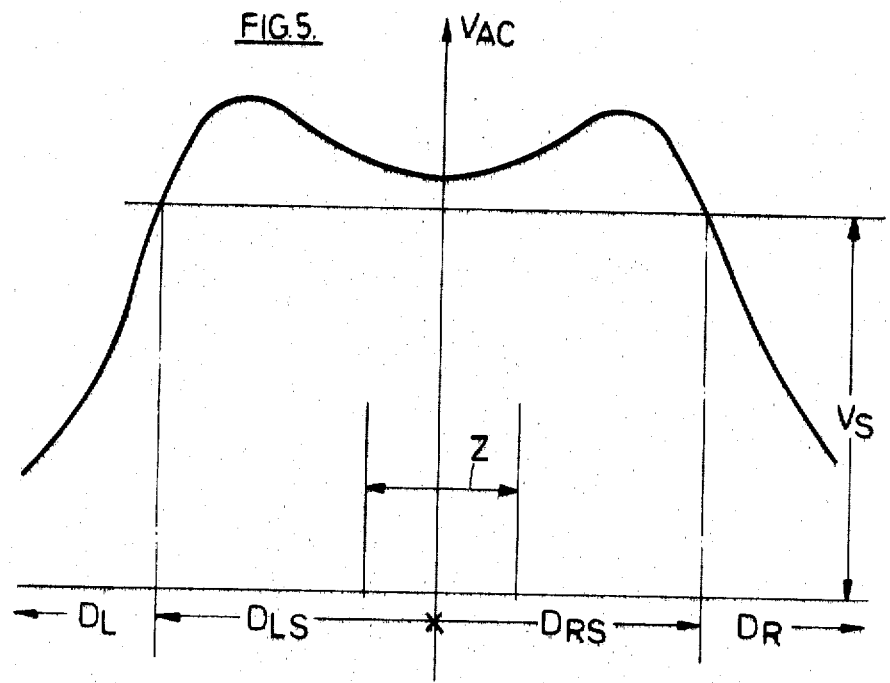
Figure 8:
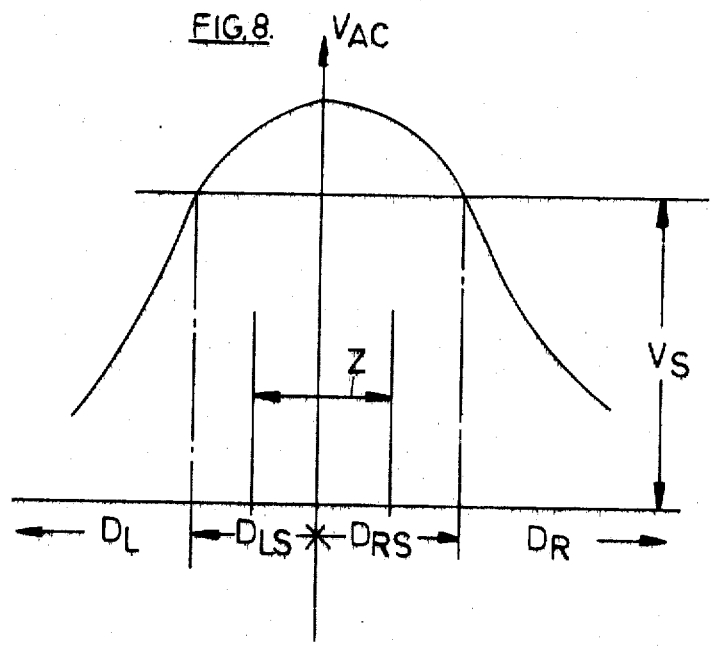
Figure 6:
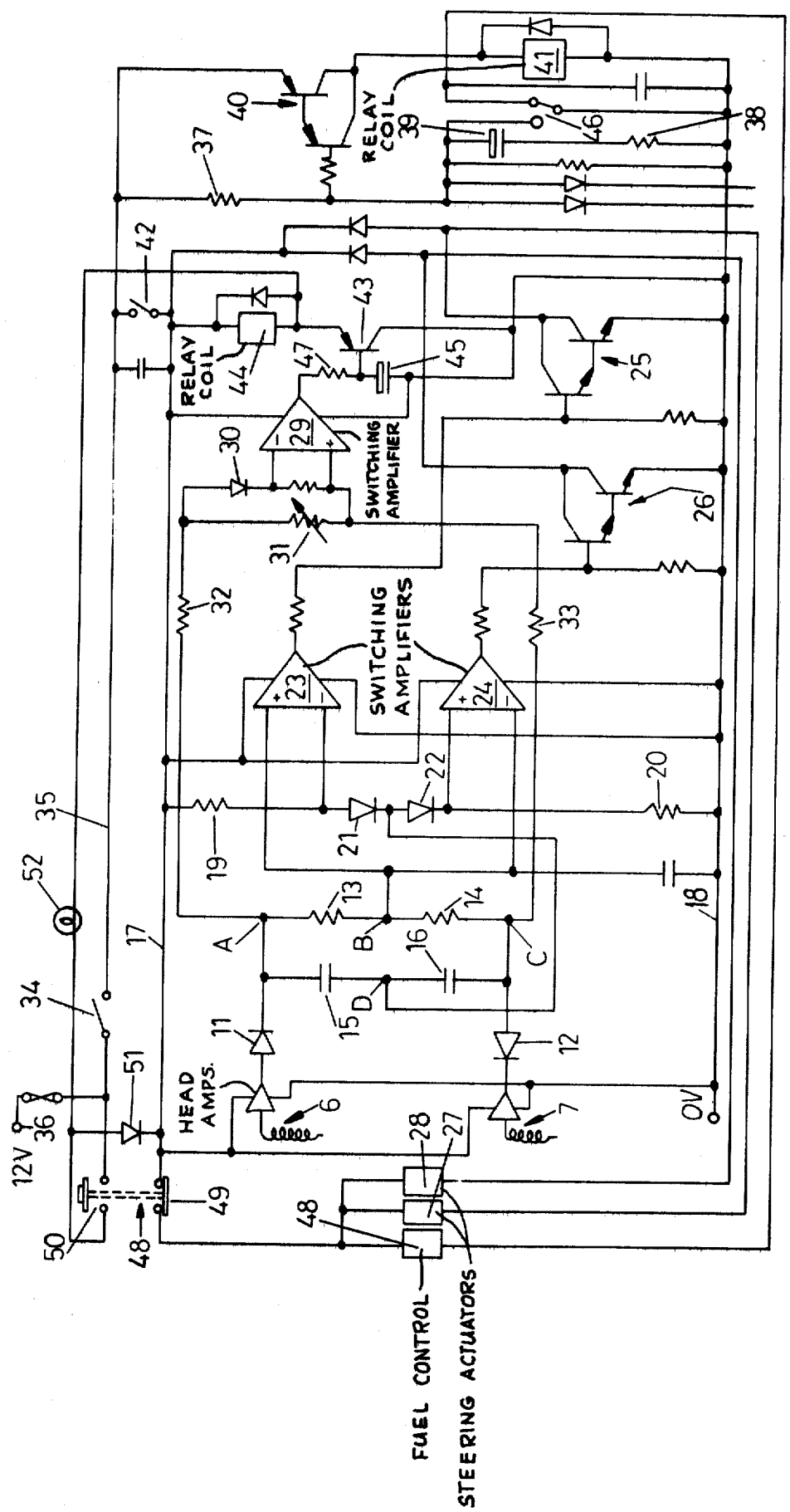
Figure 7:
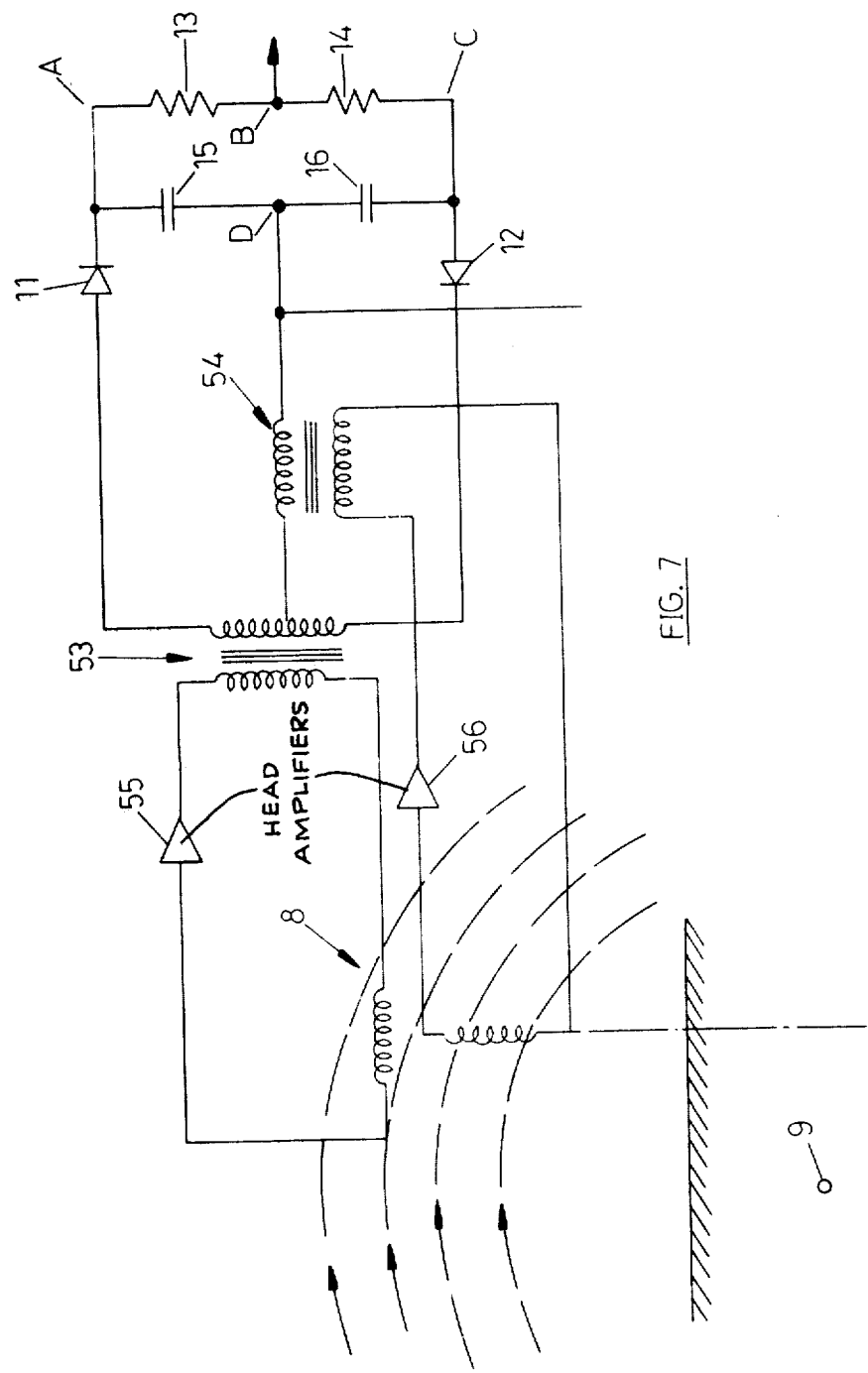

A guidance system in accordance with the invention will now be described, by way of example, with reference to the accompanying drawings, in which:

FIGS. 1, 2 and 3 are a schematic front elevation, plan and end elevation, respectively, of a guided vehicle, FIG. 4 is a schematic diagram showing the manner in which signals are induced in one form of sensing head forming part of the invention, FIG. 5 is a graph showing a typical voltage/vehicle deviation characteristic obtained by rectification and summing of the output voltages from the sensing heads of FIG. 4, FIG. 6 is a circuit diagram of a vehicle guidance system in accordance with the invention, FIG. 7 is a schematic diagram of another form of sensing head and an associated discriminator circuit, and FIG. 8 is a graph showing a typical voltage/vehicle deviation characteristic obtained by rectification and summing of the output voltages from the sensing head of FIG. 7.

Referring to FIGS. 1–3 of the drawings, a vehicle 1 has two driving wheels 2 and 3 which can be differentially braked by a steering mechanism 60, which may be of the type mentioned above, in order to steer the vehicle. Two castoring wheels 4 and 5 are provided adjacent the front and rear respectively, of the vehicle. Two sensing heads 6 and 7, or a single head 8 as described later, are mounted at the ends of a substantially horizontal transverse member at the front of the vehicle, and further head or heads (not shown) may also be similarly mounted at the rear of the vehicle. A guidance conductor 9 is embedded in the ground along the required guidance path.

Referring to FIG. 4, a magnetic field, represented by circles 10, is generated due to alternating current flowing in the conductor 9. The field cuts coils of heads 6 and 7, which are mounted on the vehicle with their axes substantially horizontal. Signals are induced in the heads in dependence upon the transverse position of the heads relative to the conductor 9.

The outputs of the heads 6 and 7 are applied, respectively, to rectifiers 11 and 12 (FIG. 6), the outputs of which are fed to respective points A and C at the ends of two potential dividers comprising, respectively, resistors 13 and 14 and capacitors 15 and 16. Centre taps B and D are provided on the resistive and capacitive potential dividers, respectively A reference voltage is applied to the point D from a resistor/diode chain connected between positive and zero voltage lines 17 and 18, respectively. This chain comprises resistors 19 and 20 and diodes 21 and 22. Bias voltages obtained from the chain are fed to the negative and positive inputs, respectively, of two differential amplifiers 23 and 24. The voltage at the centre tap B is fed to the positive and negative inputs respectively of the amplifiers 23 and 24. A power supply is fed to the amplifiers from the lines 17 and 18.

When the sensing heads 6 and 7 are symmetrically disposed relative to the guidance conductor the points A and C are at potentials of equal magnitude but opposite polarity relative to the point B, which point is at the same potential as the point D. In this condition, the negative input of the amplifier 23 is positive with respect to the reference voltage at the point D, and the positive input of the amplifier 24 is negative with respect to the reference voltage.

Deviation of the heads 6 and 7 relative to the guidance conductor causes the points A and C to vary in potential, an increase at A being accompanied by a decrease at C, and vice versa, with the result that the potential at the point B with respect to the reference voltage at the point D represents the difference in the signals from the sensing heads 6 and 7, and is therefore a measure of the deviation of the vehicle from the required path. The difference between the potentials at the points B and D represents an error voltage. In response to this voltage, the amplifiers 23 and 24, which are operated in the high gain switching mode, switch from maximum negative output to maximum positive output, when the error voltage exceeds either in the positive or negative direction, respectively, the positive and negative bias voltages applied to the amplifiers 23 and 24 from the resistor/diode chain 19 to 22. Adjustment of the component values in the chain adjusts the width of a "dead zone" in which deviation of the vehicle from the required path does not effect an alteration in the setting of the steering gear of the vehicle.

The outputs of the amplifiers 23 and 24 are fed to amplifiers 25 and 26, respectively, which energize steering control means in the form of steering actuators 27 and 28, respectively. The amplifier 25 or the amplifier 26, when conductive, connects the respective steering actuator 27 or 28 between the power supply lines 17 and 18.

In normal operation, one or other of the steering actuators will operate to cause the steering mechanism 60 to produce the necessary correction of the vehicle path immediately the boundary of the dead zone has been passed and before the error voltage becomes excessive. However, if, for some reason, the vehicle deviates excessively so that both sensing heads 6 and 7 move to the same side of the guidance conductor, the voltage between the points A and C will start to reduce and this reduction in voltage controls the operation of a further high gain switching amplifier 29. This amplifier is connected, in series with a diode 30, across a variable resistor 31 which, together with resistors 32 and 33, forms a potential divider connected between the points A and C. The diode 30 stops conducting when the voltage between A and C falls to a particular value. The value to which this voltage must fall for the diode 30 to stop conducting is determined by the potential divider 31 to 33. When the diode 30 stops conducting, the positive and negative inputs of the amplifier 29 are at the same potential, and the amplifier switches so that its output changes from 0 volts to approximately the voltage on the line 17, i.e. approximately 12 volts. Smaller reductions in the voltage between A and C may occur without making the amplifier switch, since switching takes place only when the voltage between the points A and C falls to the above-mentioned particular value.

Switching of the amplifier 29 is also obtained if no signal at all is received from the sensing heads 6 and 7. This can occur either if the flow of current in the guidance conductor ceases, or if the vehicle has moved beyond the end of the guidance conductor. In these circumstances, stop circuits as described below are made to operate, thereby stopping the vehicle.

A typical curve showing the variation of the voltage $V_{AC}$ between the points A and C with right and left deviation of the vehicle from the guidance conductor is shown in FIG. 5, the voltage being obtained by use of a pair of heads 6 and 7 as previously described. In FIG. 5, the right and left deviations of the vehicle are referenced $D_R$ and $D_L$, respectively, the dead zone is referenced Z, the level of $V_{AC}$ at which the stop circuits are operated is referenced $V_S$, and the corresponding right and left deviations at which the stop circuits are operated are referenced $D_{RS}$ and $D_{LS}$, respectively.

Different precautionary measures may be required according to the exact circumstances, and logic circuits (not shown) may be connected in the output of the amplifier 29 and controlled by appropriate signals from the vehicle.

Further circuitry provided for controlling and monitoring the operation of the guidance system will now be described. An ON/OFF switch 34, when closed, connects a line 35 to a 12 volt source 36. A series circuit comprising resistors 37 and 38 and a capacitor 39 is connected between the lines 35 and 18. A high gain amplifier 40 is connected in series with a relay coil 41 between the lines 35 and 18. When the switch 34 is closed, the capacitor 39 cannot charge, instantaneously, so the amplifier 40 is biased to conduct, and the relay coil 41 is energised. This closes a contact 42, which connects the line 17 to the 12 volt source 36, thereby energising the amplifier circuits.

A transistor 43 is connected in series with a relay coil 44 between the lines 17 and 18. The base electrode of this transistor is connected to the output of the amplifier 29, and a capacitor 45 is connected between the base electrode and the zero voltage line 18. When the switch 34 is closed, the capacitor 45 cannot charge instantaneously, and the transistor 43 is therefore biased to conduct. The relay coil 44 is thereby energised, and switches over contacts 46. This shunts the capacitor 39, the resistor 38 limiting the discharge current which flows through the contacts. The contacts 46 also hold down the potential at the base electrode of the amplifier 40, thereby maintaining the amplifier conductive. The relay coil 41 is therefore maintained in an energised state.

As explained previously, if the deviation of the vehicle from the guidance conductor is not excessive, and a guidance current is flowing in the conductor 9, the amplifier 29 produces a zero voltage output. The transistor 43 is therefore maintained conductive and the relay coil 44 remains energised. However, if the deviation becomes excessive, or if no guidance current is present in the conductor 9, the output of the amplifier 29 becomes approximately 12 volts. The capacitor 45 then charges through a resistor 47, and after a short delay the transistor 43 is biased off. The relay coil 44 becomes de-energised, and the contact 46 switches over, thereby completing the circuit of a fuel control contactor 48 which switches off the fuel supply to the engine of the vehicle. The vehicle therefore stops. After a further delay which is determined by the time required to charge the capacitor 39 via the resistor 37, the amplifier 40 is biased off and the relay coil 41 is de-energised. Hence, the contact 42 opens, thereby removing the power supply from the steering actuators 27 and 28 and the fuel control contactor 48. This delay is provided to allow time for the engine to stop before the fuel supply is re-established. Before the guidance system can be restarted, the switch 34 must be returned to the off position, and time allowed for the capacitor 39 to discharge.

A push-button switch 148 is provided so that the "lost reference" circuits which check the excessive deviation and loss of guidance current may be made to operate without the system shutting down the fuel supply to the engine. In this way, it may be checked whether the vehicle is correctly positioned so that automatic guidance can be put into operation. Operation of the switch 148 opens contacts 49 which supply power to the devices 27, 28 and 48, thereby temporarily disenabling these devices. Operation of the switch also closes contacts 50 which cause power to be supplied from the source 36, via a diode 51, to the line 17. The amplifier circuits are thereby energised, and if the deviation of the vehicle is not excessive and a guidance current is present, the transistor 43 is biased on and an indicator lamp 52 lights, thereby indicating that the vehicle is in a suitable position for automatic guidance to be operated. In the absence of a guidance current, or if there is excessive deviation, the transistor will remain non-conductive and the lamp 52 will not light.

Instead of the pair of sensing heads 6 and 7 described above, a single head 8 of the type shown in FIG. 7 may be used. Such a head and an associated Foster-Seeley discriminator circuit including amplifiers 55 and 56 and transformers 53 and 54, feeding rectifiers 11 and 12 and potential dividers 13, 14 and 15, 16, as described above, will give a $V_{AC}$ versus deviation curve of the type shown in FIG. 8.

Other sensing means may be used in place of the heads described herein, provided that a voltage is produced at the point B which is equal to the reference voltage at the point D when the vehicle is correctly placed relative to the guidance conductor, and which voltage has a positive or negative value dependent upon the lateral deviation of a reference point on the vehicle relative to the guidance conductor.

Clearly other modifications may be made to the system without departing from the scope of the invention. For example, although the actuators 27 and 28 above provide steering by causing differential braking of the wheels 2 and 3 of the vehicle, conventional front or rear wheel steering gear may be used and controlled by the actuators 27 and 28.

In the embodiment described above, when the steering actuators 27 and 28 are not energised, no steering effect is obtained and the datum condition for the system therefore provides straight-ahead steering. However, in order to steer the vehicle round a curve of small radius, means would be provided to give a predetermined steering effect, other than zero, in the datum condition. The selection of the datum steering effect might be made by use of logic circuits utilising signals derived externally to the vehicle and from signals from the vehicle itself, such circuits having been previously described as connected in the output of the amplifier 29, and/or by processing of the error signal.

A system in accordance with the invention is particularly applicable to an irrigation vehicle where a requirement can be that the vehicle should start at a point on the guidance conductor, proceed to one end, reverse, proceed to the other end, reverse and then return to the starting point. Other cycles are also possible. To allow for movement in both directions, sensing means may be mounted at both ends of the vehicle as mentioned above, and the steering circuits described above may be duplicated or shared according to requirements. Lost reference circuits may be provided for each sensing means. Consequently, when the vehicle comes to the end of the guidance conductor, one sensing means will lose the signal, but the other sensing means will still be over the conductor. The resulting signals from the lost reference circuits may be used to operate reversing means (not shown) for the vehicle and to change over the guidance from one sensing means to the other. The vehicle then returns along the conductor and when the other end is reached, a similar sequence of operations reverses the vehicle, the vehicle finally being stopped at the end of an operational cycle.

We claim:

1. A guidance system for operating a steering mechanism of a vehicle for guiding the vehicle along a path defined by a guidance conductor, the system including means for sensing the deviation of the vehicle from the defined path; steering control means operable to activate said steering mechanism by a fixed amount selectively to the left or to the right about a datum condition; and means responsive to the sensed deviation to cause the steering control means to activate the steering mechanism by said fixed amount in the appropriate direction for correcting the deviation when said deviation exceeds a predetermined value, and to maintain the activation by said fixed amount until the deviation reduces below the predetermined value, the steering mechanism then being de-activated to the datum condition.

2. A system as claimed in claim 1, in which the sensing means is responsive to a flow of current in the conductor to generate two deviation signals which vary differentially in dependence upon said deviation, and in which the deviation-responsive means is responsive to the difference between the deviation signals to cause the steering control means to activate the steering mechanism when said difference exceeds a predetermined level.

3. A system as claimed in claim 2, in which the deviation-responsive means includes means for deriving an error voltage from the difference between a reference voltage representing zero deviation and a voltage representing the difference between the deviation signals; and switching means for causing operation of the steering control means when the magnitude of the error voltage exceeds a predetermined level.

4. A system as claimed in claim 3, in which the deviation-responsive means includes means for rectifying the deviation signals and for applying the resulting voltages with opposite polarities to the ends of potential divider means, the difference between the reference voltage and the voltage at a centre tap of the potential divider means providing the error signal.

5. A system as claimed in claim 3, in which the switching means includes first and second differential amplifiers to which are applied, respectively, first and second bias voltages representing the limits of a range of values of the error voltage within which range the steering control means is to be inoperative, the error voltage being applied to both said first and second amplifiers to cause one or the other of the amplifiers to change its conductivity state when the value of the error voltage is outside said range.

6. A system as claimed in claim 2, including means operable in response to an excessive reduction in the sum of the deviation signals to cause arresting of the movement of the vehicle.

7. A system as claimed in claim 2, including means responsive to loss of said deviation signals to cause arresting of the movement of the vehicle.

8. A system as claimed in claim 2, including separate sensing means adjacent the front and rear, respectively, of the vehicle; and means responsive to the loss of deviation signals from only one or the other sensing means to cause reversal of the direction of movement of the vehicle.

9. A system as claimed in claim 6, including means for temporarily overriding the means operable in response to said excessive reduction during initial positioning of the vehicle with respect to the guidance conductor.

10. A system as claimed in claim 7, including means for temporarily overriding the means responsive to loss of the deviation signals during initial positioning of the vehicle with respect to the guidance conductor.

11. A system as claimed in claim 9, in which the overriding means includes means for temporarily disabling the steering control means.

12. A vehicle provided with a guidance system as claimed in claim 1.

13. A system as claimed in claim 1, including means operable to change said datum condition.

14. A method of guiding a vehicle along a path defined by a guidance conductor, in which the deviation of the vehicle from the path is monitored and the steering mechanism of the vehicle is activated by a fixed amount about a datum condition in the appropriate direction for correcting the deviation when the deviation exceeds a predetermined level, the steering remaining activated by said fixed amount until the deviation is reduced below said predetermined level, the steering mechanism then being de-activated to return to the datum condition.

* * * * *